United States Patent
Mallory et al.

(10) Patent No.: US 10,036,531 B2
(45) Date of Patent: Jul. 31, 2018

(54) CAMERA FLASH WITH FRESNEL OPTIC

(71) Applicant: CoreLED Systems, LLC, Livonia, MI (US)

(72) Inventors: Derek Mallory, Northville, MI (US); Brian C. Wells, Grosse Pointe Farms, MI (US); Dianna Stadtherr, Novi, MI (US)

(73) Assignee: CoreLed Systems, LLC, Livonia, MI (US)

( * ) Notice: Subject to any disclaimer, the term of this patent is extended or adjusted under 35 U.S.C. 154(b) by 0 days.

(21) Appl. No.: 15/258,496

(22) Filed: Sep. 7, 2016

(65) Prior Publication Data

US 2017/0068146 A1 Mar. 9, 2017

Related U.S. Application Data

(60) Provisional application No. 62/215,375, filed on Sep. 8, 2015.

(51) Int. Cl.
| | |
|---|---|
| *G03B 15/06* | (2006.01) |
| *F21V 5/04* | (2006.01) |
| *G02B 3/08* | (2006.01) |
| *H04N 5/225* | (2006.01) |

(52) U.S. Cl.
CPC ............... *F21V 5/045* (2013.01); *G02B 3/08* (2013.01); *G03B 2215/0503* (2013.01); *G03B 2215/0589* (2013.01); *H04N 5/2256* (2013.01)

(58) Field of Classification Search
CPC ........... G03B 15/03; G03B 21/60; G03B 3/08

USPC .............. 396/155, 199; 359/570; 362/311.09
See application file for complete search history.

(56) References Cited

U.S. PATENT DOCUMENTS

| | | | |
|---|---|---|---|
| 4,411,490 A | 10/1983 | Daniel | |
| 5,337,179 A * | 8/1994 | Hodges | B29D 11/0073 359/443 |
| 5,408,395 A | 4/1995 | Schmid et al. | |
| 6,046,859 A | 4/2000 | Raj | |
| 6,273,588 B1 | 8/2001 | Arakelian | |
| 6,658,209 B1 * | 12/2003 | Ito | G03B 15/05 396/175 |
| 8,262,252 B2 | 9/2012 | Bergman et al. | |
| 8,360,608 B2 | 1/2013 | Wildner | |
| 8,845,129 B1 | 9/2014 | Holder et al. | |
| 2005/0024868 A1 | 2/2005 | Nagai et al. | |
| 2005/0190563 A1 * | 9/2005 | Li | F21V 5/045 362/332 |
| 2007/0035679 A1 * | 2/2007 | Lee | G02F 1/133603 349/58 |
| 2012/0114323 A1 * | 5/2012 | You | G02B 3/08 396/176 |
| 2013/0026515 A1 * | 1/2013 | Chen | H01L 33/58 257/98 |

* cited by examiner

*Primary Examiner* — Clayton E Laballe
*Assistant Examiner* — Fang-Chi Chang
(74) *Attorney, Agent, or Firm* — Butzel Long; Gunther J. Evanina

(57) ABSTRACT

A camera flash is provided with a lens element adjacent a light source, wherein the lens element has a plurality of concentric ridges projecting from a surface of the generally planar member to define facets of a Fresnel lens, and wherein the plurality of concentric ridges define a generally square or rectangular shape having rounded corners.

14 Claims, 5 Drawing Sheets

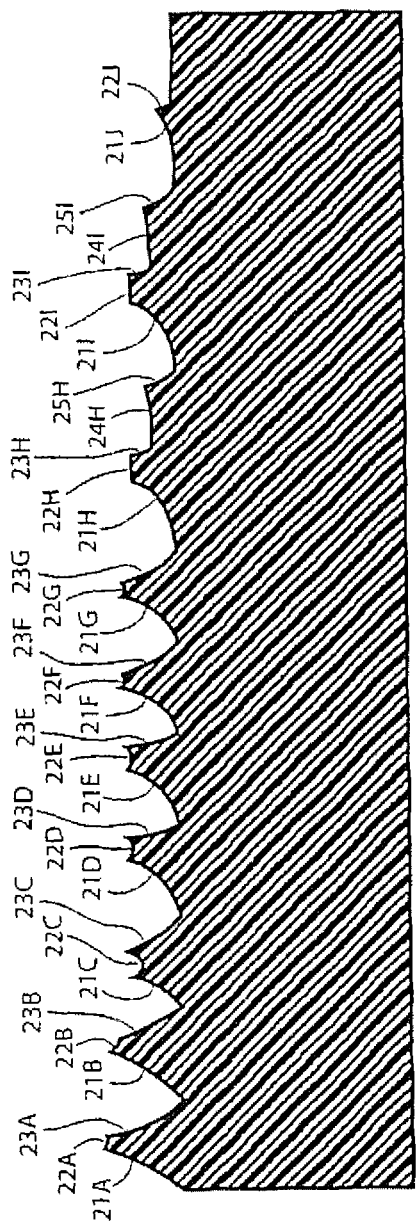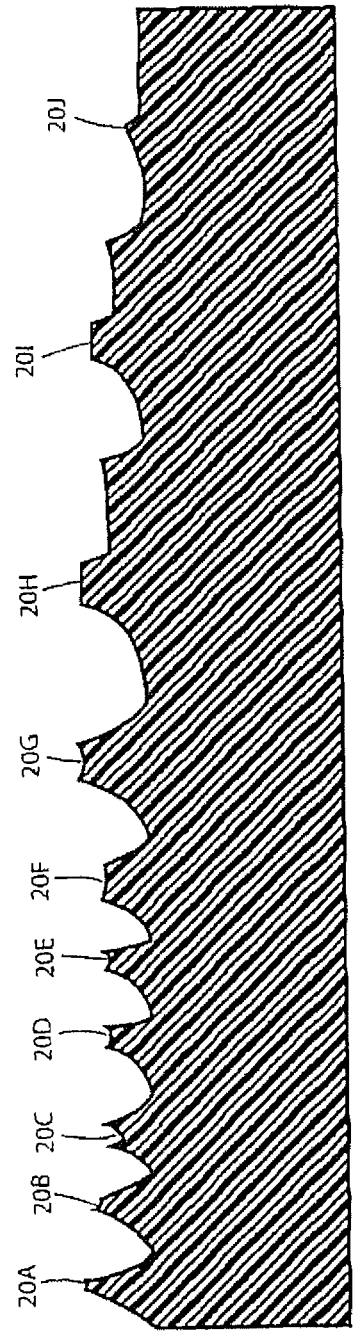

CAMERA FLASH WITH FRESNEL OPTIC

CROSS-REFERENCE TO RELATED APPLICATIONS

This application claims priority to provisional Application No. 62/215,375 filed on Sep. 8, 2015, which is incorporated herein by reference in its entirety.

FIELD OF THE DISCLOSURE

This disclosure relates to camera flash or strobe systems having a Fresnel lens.

BACKGROUND OF THE DISCLOSURE

Cameras and other devices that include image sensors, including cellular telephones, smart phones, and tablet computers, often have a flash system to illuminate the subject being recorded under low light conditions. The lenses used on these flash systems provide a flash output that is perceivably non-uniform.

SUMMARY OF THE DISCLOSURE

A camera flash that provides uniform flash output in a generally square or rectangular pattern is disclosed. The camera flash includes a light source, and associated power source and controls for generating an intense pulse of light as a camera records an image; and a generally planar lens element adjacent the light source for redirecting light from the light source toward a subject that is to be photographed, wherein the lens element has a plurality of concentric ridges projecting from a surface of the generally planar lens element to define facets of a Fresnel lens, and wherein the plurality of concentric ridges each define a generally square or rectangular shape having rounded corners.

Also provided is a camera having an image sensor for recording an image of a subject, and the disclosed camera flash located adjacent the image sensor.

BRIEF DESCRIPTION OF THE DRAWINGS

FIG. 2 is a horizontal cross-sectional profile of half of the lens element shown in Figure I.

FIG. 3 is a diagonal cross-sectional profile of half of a lens element shown in FIG. 1.

DETAILED DESCRIPTION OF ILLUSTRATED EMBODIMENTS

Figure 1:
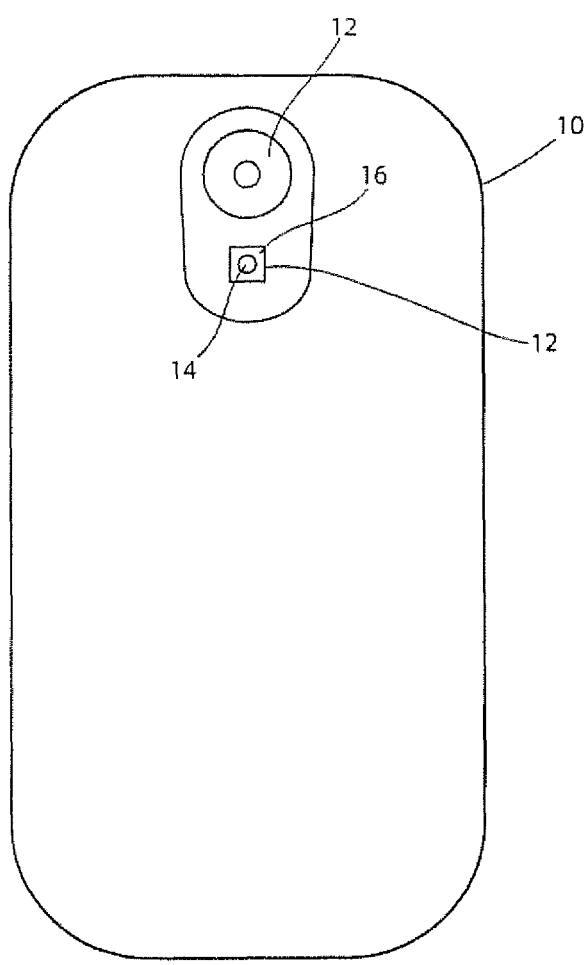
FIG. 1 is a rear view of a device having an image sensor and a camera flash including a lens element.

Shown in FIG. 1 in a device 10 (e.g., a smart phone) having an image sensor 12 and a camera flash 12. Camera flash 12 includes a light source 14 (e.g., a light-emitting diode) and a lens element 16 for redirecting light from light source 14 onto a subject that is to be illuminated as the subject (i.e., a person or object) is being photographed by the image sensor 12.

A generally planar lens element 16 can be manufactured using known precision injection molding and embossing transfer techniques. Alternatively, the lens element could be injection molded. The term "generally planar" refers to a lens member 16 having an overall planar structure with opposite substantially flat surfaces interrupted on one side (e.g., the side facing light source 14) by very low profile light diffracting facets.

Figure 4:
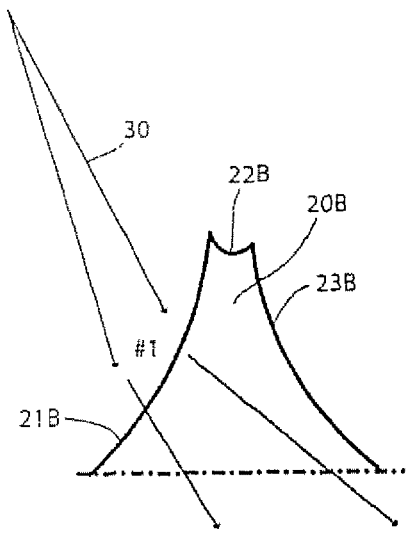
FIG. 4 is a schematic illustration of light impinging on a first Fresnel facet of a ridge on a lens element of the device shown in FIG. 1.
Figure 5:
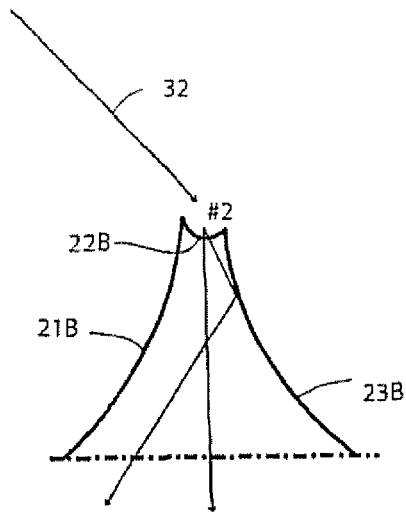
FIG. 5 is a schematic illustration of light impinging on a second Fresnel facet of the ridge shown in FIG. 4.

Lens element 16 has a plurality of concentric ridges 20A-20J (FIGS. 2 and 3). The plurality of concentric ridges provide a Fresnel type lens in which a lens having a large aperture and short focal length is provided in a compact lens configuration requiring less mass and volume than a functionally equivalent lens of a more typical or conventional design. The heights of the concentric ridges are typically less than 0.5 mm to facilitate a compact lens design and a compact luminaire assembly, which requires less material, and more compact, lighter weight and less expensive lighting fixtures and housings (e.g., 2 foot by 4 foot troffers). Each of the ridges 20A-20J defines light refracting surfaces or facets 21A, 22A, 23A, 21B, 22B, 23B, 21C, 22C, 23C, 21D, 22D, 23D, 21E, 22E, 23E, 21F, 22F, 23F, 21G, 22G, 23G, 21H, 22H, 23H, 24H, 25H, 21I, 22I, 23I, 24I, 25I, 21J and 22J. The inwardly facing facets 21A, 21B, 21C, 21D, 21E, 21F, 21G, 21H, 21I and 21J diffract light outwardly away from the center of lens element 16A. Generally upwardly facing facets 22A, 22B, 22C, 22D, 22E, 22F, 22G, 22H and 22I diffract light toward outwardly facing facets 23A, 23B, 23C, 23D, 23E, 23F, 23G, 23H and 23I, which through internal reflection redirect light inwardly toward the center of the lens element. This effect is indicated in FIGS. 4 and 5, which show light beam 30 impinging on facet 21B of ridge 20B being directed outwardly away from the center of lens element 16A, and light beam 32 impinging on facet 22B being directed toward facet 23B and reflected inwardly toward the center of lens element 16A.

Figure 6:
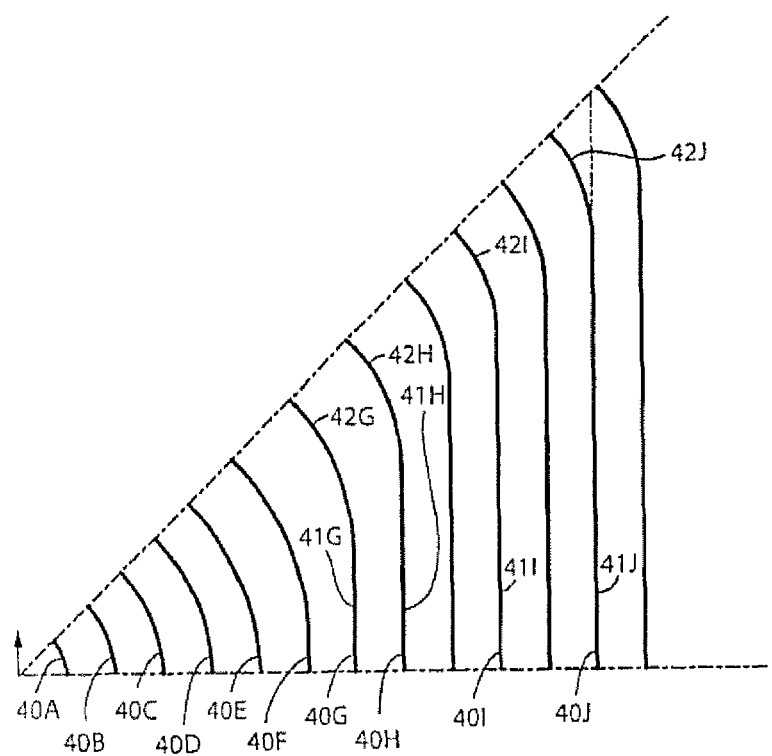
FIG. 6 is a graphical representation of a one-eighth section of the center lines of concentric ridges on a lens element of the device shown in FIG. 1.

FIG. 6 provides a graphical illustration of a one-eighth section of the center lines 40A-40J of the illustrated concentric ridges 20A-20J. Each of the remaining seven sections is a mirror image of an adjacent section. Several of the ridges have a generally square or rectangular shape, with straight sides and rounded corners as defined by straight sections 41G-41J and rounded sections 42G-42J of center lines 40G-40J. Several of the ridges (e.g., ridges 20A-20F) can be continuously curved as indicated by center line 40A-40F.

Generally, all of the facets are concave, with most ridges (e.g., 20A-20I) having an inwardly facing facet 21A-21I and an outwardly facing facet 23A-23I, as well as upwardly facing facets 22A-22I to direct light both outwardly and inwardly toward the center of lens element 16. Ridge 20J has only inwardly facing facet 21J and outwardly facing facet 22J to direct light only in a generally outward direction.

Lens member 16 is positioned in close proximity to the light source 14. In particular, the ridges are typically a maximum of about 0.3 mm in height from the planar surface of lens member 16, and the light source 14 can be positioned less than 5 mm from the main planar surface of lens member 16, or less than 3 mm, or less than 2 mm. This facilitates a very compact configuration that reduces mass, volume and cost.

Figure 7:
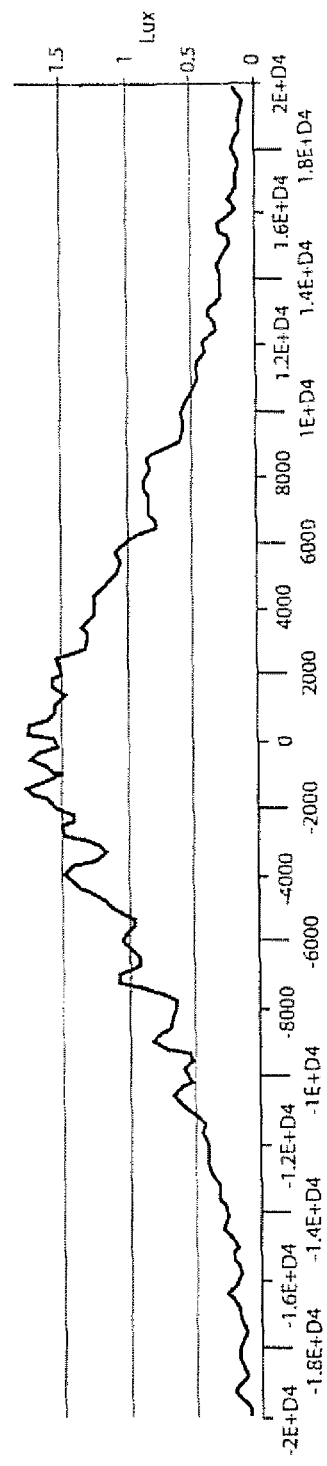
FIG. 7 is a graphical representation of illuminance for a Duris E5 (yellow) LED alone, without a lens, as a function of distance from a center line of the LED.

FIG. 7 shows the illuminance on a surface for a Duris E5 (yellow) LED alone, without a lens, as a function of distance from a center line of the LED. The light is spread over a very wide area, extending radially for about 20 meters.

Figure 8:
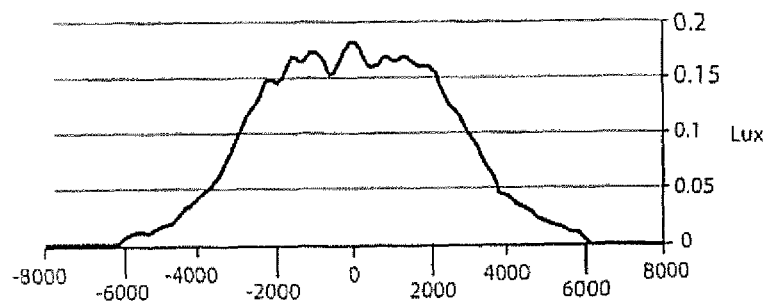
FIG. 8 is a graphical representation of illuminance for the LED of FIG. 7 used with a lens element as disclosed herein as a function of distance from the center line of the LED.

FIG. 8 shows the illuminance on a surface for the same LED with a lens as illustrated. The light is more narrowly focused into a smaller area having a radius of about 6 meters. Because area is related to the square of the radius, the light from lens element 16 is redirected or focused over an area that is less than 20% or less than 10% of the area illuminated by the same LED alone without a lens. In addition to narrowly focusing the light, lens element 16A also reshapes the light distribution, so that the illuminance along the surface generally decreases linearly with distance from the center line of the LED.

Figure 9:
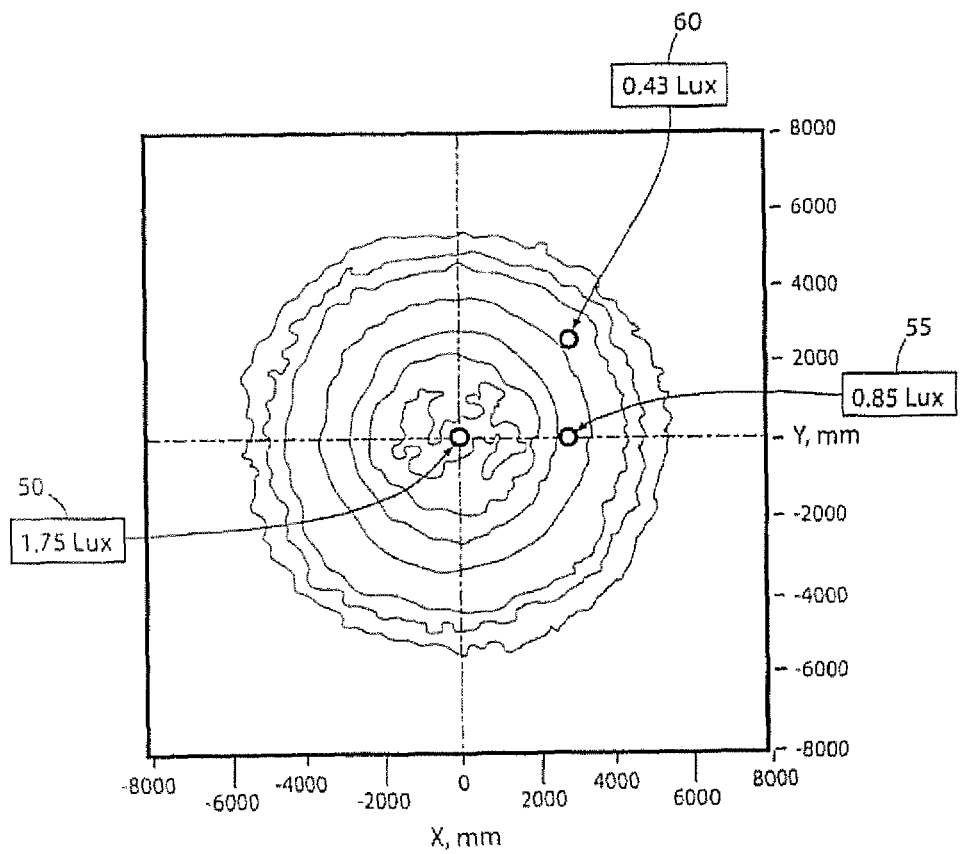
FIG. 9 is a graphical representation of illuminance over an area parallel to a generally planar lens element and perpendicular to the general direction in which light is propagated from an LED through the lens element.

FIG. 9 is a graphical illustration of the illuminance over an area parallel to a generally planar lens element of an assembly comprising an LED positioned adjacent the lens element. The light from the LED is distributed over the surface such that the maximum luminous flux (e.g., 1.75 lux) is at a center point 50 of the area. At side points 55, an approximately equal distance (e.g., about 3000 mm) in each of four different directions spaced 90° apart, the luminous flux is approximately 50% of the maximum luminous flux (e.g., about 0.85 lux). At four corner points 60 of a square having sides defined by lines passing through the side points, with the side points centered on the sides of the square, the luminous flux is 25% of the maximum luminous flux (e.g., about 0.43 lux). As a result, a plurality of pairs of identical LEDs and lens elements can be arranged in an array in which the sides of adjacent lens elements meet (i.e., abut or approximately coincide), and in which the corners of four mutually adjacent lens elements meet. This arrangement allows expanded lighting patterns to be assembled such that the illuminance is uniformly distributed over the entire area illuminated by a composite luminaire having a plurality of LEDs and a plurality of corresponding lens elements.

By providing ridges 20 that comprise facets that direct light in both a direction away from a center of each of the generally planar lens elements 16A and a direction toward the center of each of the generally planar lens elements, light can be spread more uniformly.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A camera flash comprising:
   a light source, and associated power source and controls for generating an intense pulse of light as a camera records an image; and
   a generally planar lens element adjacent the light source for redirecting light from the light source toward a subject that is to be recorded, the lens element having a first side including a flat surface and a second side facing the light source having a generally flat surface interrupted by a plurality of concentric ridges projecting from a surface of the generally planar lens element to define facets of a Fresnel lens, wherein each of a plurality of the concentric ridges define a generally square or rectangular shape having straight sides and rounded corners, and wherein at least one of the concentric ridges includes a first concave facet facing toward a top center of the generally planar lens element, a second concave facet facing away from the top center of the generally planar lens element, and a third continuously concave facet extending between an upper end of the first facet and an upper end of the second facet.

2. The camera flash of claim 1, in which the generally planar lens element is positioned with a top center of the generally planar lens element less than 5 mm from the light source.

3. The camera flash of claim 1, in which each of the plurality of concentric ridges has a height that is less than 0.5 mm.

4. The camera flash of claim 1, in which the lens element concentrates light from the light source over an area that is less than 20% of an area illuminated by the light emitting diode alone without the lens element.

5. The camera flash of claim 1, in which at least one of the concentric ridges comprises facets that direct light in both a direction away from a center of each of the generally planar lens elements and a direction toward the center of each of the generally planar lens elements.

6. The camera flash of claim 1, in which the lens element further comprises at least one concentric ridge that has a generally circular shape.

7. The camera flash of claim 1, in which the light source is a light emitting diode.

8. A camera comprising:
   an image sensor for recording an image of a subject; and
   a camera flash adjacent the image sensor, the camera flash including a light source and associated power source and controls for generating an intense pulse of light as the camera records an image, and a generally planar lens element adjacent the light source for redirecting light from the light source toward a subject that is to be recorded, the lens element having a first side including a flat surface and a second side facing the light source having a generally flat surface interrupted by a plurality of concentric ridges projecting from a surface of the generally planar lens element to define facets of a Fresnel lens, wherein each of a plurality of the concentric ridges define a generally square or rectangular shape having straight sides and rounded corners, and wherein at least one of the concentric ridges includes a first concave facet facing toward a top center of the generally planar lens element, a second concave facet facing away from the top center of the generally planar lens element, and a third continuously concave facet extending between an upper end of the first facet and an upper end of the second facet.

9. The camera of claim 8, in which the generally planar lens element is positioned with a top center of the generally planar lens element less than 5 mm from the light source.

10. The camera of claim 8, in which each of the plurality of concentric ridges has a height that is less than 0.5 mm.

11. The camera of claim 8, in which the lens element concentrates light from the light source over an area that is less than 20% of an area illuminated by the light emitting diode alone without the lens element.

12. The camera of claim 8, in which at least one of the concentric ridges comprises facets that direct light in both a direction away from a center of each of the generally planar lens elements and a direction toward the center of each of the generally planar lens elements.

13. The camera of claim 8, in which the lens element further comprises at least one concentric ridge that has a generally circular shape.

14. The camera of claim 8, in which the light source is a light emitting diode.

* * * * *